US012744785B2

(12) United States Patent
Vikramaratne et al.

(10) Patent No.: US 12,744,785 B2
(45) Date of Patent: Sep. 22, 2026

(54) PRIORITIZING OPERATIONS OVER CONTENT OBJECTS OF A CONTENT MANAGEMENT SYSTEM

(71) Applicant: Box, Inc., Redwood City, CA (US)

(72) Inventors: Victor De Vansa Vikramaratne, Sunnyvale, CA (US); Kave Eshghi, Los Altos, CA (US); David Vengerov, San Jose, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 18/439,680

(22) Filed: Feb. 12, 2024

(65) Prior Publication Data

US 2024/0314135 A1 Sep. 19, 2024

Related U.S. Application Data

(63) Continuation of application No. 17/163,222, filed on Jan. 29, 2021, now Pat. No. 11,936,656.

(Continued)

(51) Int. Cl.
*G06F 9/48* (2006.01)
*G06F 21/62* (2013.01)

(Continued)

(52) U.S. Cl.
CPC ........ *H04L 63/102* (2013.01); *G06F 21/6245* (2013.01); *G06F 1/329* (2013.01); *G06F 9/4881* (2013.01); *H04L 2463/082* (2013.01)

(58) Field of Classification Search
CPC ......... G06F 9/4881–5055; G06F 1/329; G06F 21/50–6245
See application file for complete search history.

(56) References Cited

U.S. PATENT DOCUMENTS 6,851,058 B1 * 2/2005 Gartside ................. G06F 21/56 726/24
7,188,367 B1 * 3/2007 Edwards ............... G06F 21/566 713/188

(Continued)

OTHER PUBLICATIONS

Overview of Real-Time Antivirus Scanning Engines L. Radvilavicius, L. Marozas and A. Cenys (Year: 2012).*

(Continued)

*Primary Examiner* — April Y Blair
*Assistant Examiner* — Paul V Mills
(74) *Attorney, Agent, or Firm* — Vista IP Law Group, LLP

(57) ABSTRACT

Content object operations over content objects of a content management system are prioritized to be performed immediately, or at a later time. The immediate scheduling of an operation is determined by policies, rules, and/or predictive model outcomes. The determination for later time scheduling is based on analysis of a history of events on content objects. If the content object operation is deemed to be at least potentially delayable to a later time, then a scheduling model is consulted to determine an urgency of performing the content object operation on the content object. The urgency value resulting from consulting the scheduling model is combined with then-current resource availability to determine a timeframe for performance of the content object operation on the content object relative to other entries in a continuously updated list of to-be-performed operations. The performance of the content object operation on the content object is initiated in due course.

21 Claims, 10 Drawing Sheets

Related U.S. Application Data

(60) Provisional application No. 62/706,868, filed on Sep. 14, 2020.

(51) Int. Cl.
*H04L 9/40* (2022.01)
*G06F 1/329* (2019.01)

(56) References Cited

U.S. PATENT DOCUMENTS 7,676,845 B2 3/2010 Thomas et al.
8,443,445 B1 * 5/2013 Andruss ................ G06F 21/564 726/24
8,549,435 B1 10/2013 Bushore et al.
9,141,431 B1 * 9/2015 Godunov ............. G06F 9/5011
9,141,794 B1 * 9/2015 Soubramanien ...... G06F 21/564
10,671,721 B1 * 6/2020 Otvagin ................ H04L 63/145
10,701,238 B1 * 6/2020 Golubitsky ........ H04N 1/00954
11,068,592 B1 * 7/2021 Namballa ............. G06F 9/4843
2005/0149749 A1 7/2005 Van Brabant
2007/0271570 A1 11/2007 Brown et al.
2009/0172685 A1 7/2009 Shavit
2010/0199350 A1 * 8/2010 Lilibridge ............. G06F 21/562 718/105
2010/0242109 A1 * 9/2010 Lee ....................... G06F 21/564 707/E17.039
2012/0297486 A1 * 11/2012 Turbin .................. G06F 21/566 726/24
2013/0110854 A1 5/2013 Lockhart et al.
2014/0310713 A1 10/2014 Kaldor
2015/0237102 A1 8/2015 Baccichet et al.
2016/0092683 A1 * 3/2016 Mityagin .............. G06F 21/566 726/24
2017/0091455 A1 * 3/2017 Levchenko ......... G06F 21/6218
2020/0034534 A1 1/2020 Toley et al.
2020/0036731 A1 1/2020 Bochare et al.
2020/0120100 A1 * 4/2020 Hu .......................... H04L 67/60
2020/0201994 A1 * 6/2020 Gahlot .................. G06F 21/562
2020/0302058 A1 * 9/2020 Kenyon ................ G06F 21/554
2021/0081532 A1 * 3/2021 Mungre ................ G06F 21/566
2021/0081555 A1 * 3/2021 Mungre ................ G06F 21/564

OTHER PUBLICATIONS

"Create anti-malware exceptions," Trend Micro Incorporated, copyright 2020.
"Machine Learning for Malware Detection," Kaspersky, Copyright 2021.
"Machine Learning in Cybersecurity," Kaspersky, date obtained via Internet Archive as Jan. 23, 2021, URL: https://usa.kaspersky.com/enterprise-security/wiki-section/products/machine-learning-in-cybersecurity.
"Deep Security 10.0: Best Practice Guide," Trend Micro, dated Aug. 27, 2020.
"Deep Security as a Service Guide," Trend Micro, dated Sep. 16, 2020.
Overview of Real-Time Antivirus Scanning Engines L. Radvilavicius, L. Marazas and A. Cenys (Year: 2012).
Non-Final Rejection dated Mar. 31, 2023, for U.S. Appl. No. 17/163,222.
Notice of Allowance dated Nov. 2, 2023, U.S. Appl. No. 17/163,222.

* cited by examiner

5B00

PRIORITIZING OPERATIONS OVER CONTENT OBJECTS OF A CONTENT MANAGEMENT SYSTEM

RELATED APPLICATIONS

The present application continuation of U.S. patent application Ser. No. 17/163,222 filed on Jan. 29, 2021, which claims the benefit of priority to U.S. Provisional Patent Application Ser. No. 62/706,868 titled "DIGITAL SECURITY" filed on Sep. 14, 2020, which are hereby incorporated by reference in their entirety; and the present application is related to U.S. patent application Ser. No. 17/163,243 titled "SELECTING CONDITIONALLY INDEPENDENT INPUT SIGNALS FOR UNSUPERVISED CLASSIFIER TRAINING", filed on Jan. 29, 2021, which are hereby incorporated by reference in their entirety.

TECHNICAL FIELD

This disclosure relates to content management systems, and more particularly to techniques for prioritizing operations over content objects of a content management system.

BACKGROUND

Modern collaboration systems manage many millions of content objects, with many more content objects being created moment by moment. These content objects are shared by many users in many forms and potentially in many different geographies. For example, an announcement by the CEO of a company might be captured in a file that is shared for read-only access by every employee of the company, which could number in the hundreds of thousands of employees across hundreds of countries. To accommodate the large number of employees, any or all of whom will access the announcement, the original file with the announcement is converted into a compact, read-only format (e.g., a "preview" format) that suits wide distribution over the Internet. Also, to accommodate geographic distribution and to accommodate security-related document handling that may be specific to the company and/or to any particular country, the files might need to be labeled (e.g., with security clearances). Moreover, due to the very nature of providing a file for access over the Internet, the files are at least potentially vulnerable to malicious actions taken by malefactors (e.g., malevolent persons, malevolent executable code, etc.).

This sets up scenarios where virtually all incoming files need to be processed (1) for conversion (e.g., into different formats), (2) for labeling (e.g., with security-oriented labels), and (3) for security vulnerability scanning (e.g., scanning for malware). This file processing becomes very compute intensive as the number of files to be processed becomes larger and larger, and as the rate of incoming files also becomes larger and larger.

The foregoing compute-intensive scenario is exacerbated by the fact that the conversion formats might change over time, and/or the fact that labeling requirements change over time, and/or the fact that techniques for scanning for security vulnerabilities change over time. When such changes occur, the number of files over which computing operations (e.g., conversion, labeling and scanning) is to be performed (or performed again according to changed requirements) grows unboundedly and, as such, the amount of computing resources demanded for performing the operations also grows unboundedly to the point where it is impractical to perform such operations over all files whenever there is an incoming file and/or whenever there is a changed requirement.

Rules and/or heuristics could be applied in an attempt to filter out some of the files from consideration, however application of rules and/or heuristics exhibit the unwanted phenomenon of being either too coarse or too fine. Specifically, a coarse filter based on rules and/or heuristics yields too many files, and thus does not address the unwanted side effect of a huge demand for computing resources. Alternatively, a fine filter based on rules and/or heuristics yields too few files, and although such a fine filter might address the problem of the huge demand for computing resources, a fine filter has the unwanted side effect that a user might have to wait to access a file that had been filtered out by the fine filter, but nevertheless might need to be converted and/or labeled and/or scanned for malware before granting access to the requesting user.

Therefore, what is needed is an approach that addresses when to schedule content object operations on which content objects in the presence of resource limitations.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for prioritizing operations over content objects of a content management system, which techniques advance the relevant technologies to address technological issues with legacy approaches.

Specifically, one approach is to consult a machine learning predictor to accurately determine if and when any particular user is likely going to soon raise a request to access a particular content object, and then perform various conversion, labeling and scanning operations on the particular content object before the particular user does in fact raise such an access request. The operations on the particular content object are initiated on a schedule that completes the operations in time such that the user does not experience any delay due to performance of the operations. Disclosed herein are ways to accurately predict if and when and how any user might want to access any particular content object, and then if and when and how to schedule corresponding content object operations.

Additionally, the present disclosure describes techniques used in systems, methods, and in computer program products for continuously updating a machine learning predictor to continuously determine scheduling priorities. Certain embodiments are directed to technological solutions for deploying a continuously updated list of to-be-performed operations over content objects of a content management system.

The herein-disclosed techniques provide technical solutions that address the technical problems attendant to scheduling content object operations for just-in-time completion in the presence of resource limitations. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems underlying scheduling content object operations for just-in-time completion in the presence of resource limitations both memory usage and CPU cycles demanded are significantly reduced as compared to the memory usage and CPU cycles that would be needed but for practice of the herein-disclosed techniques. Strictly as one example, deploying a continuously updated list of to-be-performed operations over content objects of a content management system serves to greatly reduce instantaneous usage of both memory and CPU cycles as compared to alternative approaches.

The ordered combination of steps of the embodiments serve in the context of practical applications that perform steps for deploying a continuously updated machine learning predictor to determine operation scheduling priorities more efficiently by delaying some to-be-performed operations over content objects until a later moment in time such that instantaneous usage of both memory usage and CPU cycles is greatly reduced. As such, techniques for deploying a continuously updated machine learning predictor to determine operation scheduling priorities overcome long standing yet heretofore unsolved technological problems associated with scheduling content object operations for just-in-time completion in the presence of resource limitations that arise in the realm of computer systems.

Many of the herein-disclosed embodiments for deploying a continuously updated machine learning predictor to determine operation scheduling priorities are technological solutions pertaining to technological problems that arise in the hardware and software arts that underlie content management systems. Aspects of the present disclosure achieve performance and other improvements in peripheral technical fields including, but not limited to, content distribution networks and predictive model design.

Some embodiments include a sequence of instructions that are stored on a non-transitory computer readable medium. Such a sequence of instructions, when stored in memory and executed by one or more processors, cause the one or more processors to perform a set of acts for deploying a continuously updated machine learning predictor to determine operation scheduling priorities.

Some embodiments include the aforementioned sequence of instructions that are stored in a memory, which memory is interfaced to one or more processors such that the one or more processors can execute the sequence of instructions to cause the one or more processors to implement acts for deploying a continuously updated machine learning predictor to determine operation scheduling priorities.

In various embodiments, any combinations of any of the above can be combined to perform any variations of acts for continuously updating a machine learning predictor to determine scheduling priorities, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
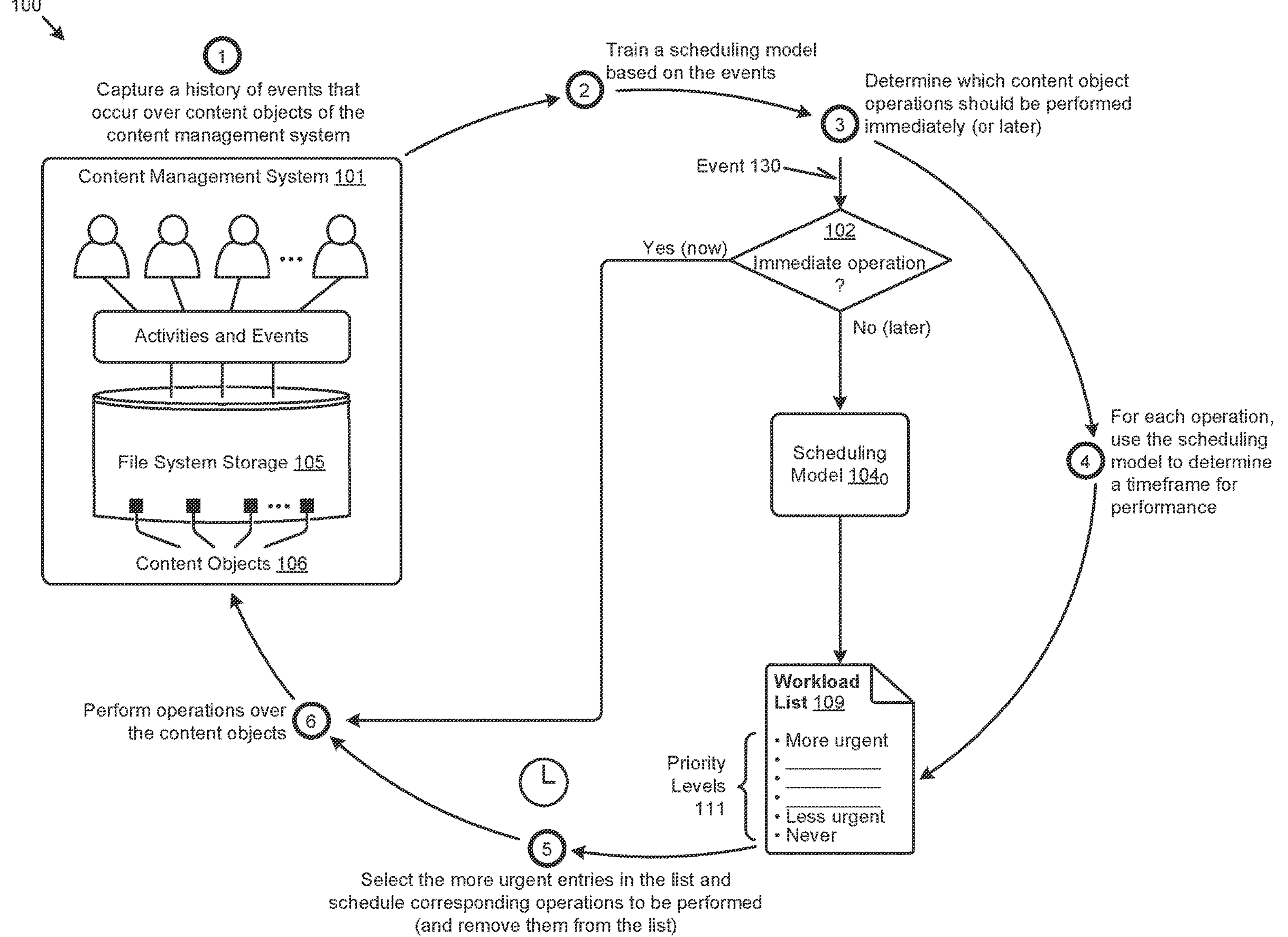
FIG. 1 depicts an environment in which embodiments of the invention can be practiced.

Aspects of the present disclosure solve problems associated with using computer systems for scheduling content object operations for just-in-time completion in the presence of resource limitations. These problems are unique to, and may have been created by, various computer-implemented methods used in content management systems. Some embodiments are directed to approaches for deploying a continuously updated machine learning predictor to determine operation scheduling priorities. The accompanying figures and discussions herein present example environments, systems, methods, and computer program products.

Overview

Embodiments implement one or more predictors that are used to predict if and when (and how) any user might want to access any particular content object. A machine learning model is trained on events that have occurred in a content management system so as to predict the likelihood of a future access event (e.g., within a minute, within an hour, etc.). Another model is used to correlate conditions pertaining to the particular content object with a conclusion that one or more particular operations are to be scheduled immediately so as to eliminate or reduce the chance that users do not experience any delay due to the time it takes to complete the operations.

The signals that go into training of the model to predict the likelihood of a future access event include signals that are known to be predictors of a particular type of access, and/or that are known to be predictors of need for a particular operation. As examples, (1) certain permissions or other designations on a folder (e.g., 'hot folder', 'In Box', etc.) would raise the probability that there will soon be a download access that would demand a malware scan, (2) certain characteristics of the file (e.g., name of file) and/or certain historical data (e.g., whether users have recently downloaded the file, etc.) may indicate the need to invoke labeling operations, and (3) certain recent actions (e.g., recent access of a file) and/or file or environmental conditions (e.g., importance of a file, role of the user who created that file, importance of the project, etc.) may indicate the need to invoke file conversion operations (e.g., to generate previews, alternative views, etc.).

Once models are at least initially operational (e.g., trained on at least some historical signals), then the content management system can use the models to determine priorities assigned to a given operation over a given content object. The models can be applied to new content objects that are incoming into the content management system, or the models can be applied to content objects that have already been stored in the content management system. In cases where there are a large number of content objects that have already been stored in the content management system, a mechanism for batching content objects for consideration can be employed.

Once priorities have been assigned to performance of a given operation over a given content object, the actual timing of invocation of the operation can be scheduled based upon an optimization function that considers resource availabilities, budget constraints, and/or timing severity/threshold constraints. Strictly as examples, a priority can be based, at least in part, upon whether the author of the file is a super-node, and/or based on the sensitivity of the content object itself, and/or based on the extent of sharing, etc. . . . Again, strictly as examples, the actual timing of invocation of the operation can be scheduled based upon a time of day in a particular geography (e.g., so a computer server is not impacted during core hours in that geography). Further, the actual timing of invocation of the operation can be scheduled based upon weightings that correspond to certain heuristic considerations such as (a) more urgency for malware scans, (b) less urgency for conversion operations, and (c) even less urgency for labeling operations. Still further, the actual timing of invocation of the operation can be scheduled based upon weightings that correspond to certain heuristic considerations, such as accelerating malware scans for files that are accessed by any one or more of a selected set of users (e.g., departing users, etc.).

Some embodiments include then-current conditions that are in turn used to set and/or adjust constraints, and/or some embodiments include user inputs that in turn serve to define and/or select and/or modify optimization functions, etc. Some embodiments automatically select a set of constraints and some embodiments automatically determine thresholds that are used in triggering, prioritization and/or actual scheduling of operations onto computing resources. Some embodiments consider policing (e.g., to be egalitarian or otherwise fair to all customers) and/or guarantees (e.g., to achieve a guarantee based on a service level agreement). Some embodiments are aware of the effect of a late operation so as to minimize user experience impact. Some embodiments consider whether or not a processed file is to be replicated across geographies (e.g., if there are globally-distributed replicate sites). Some embodiments consider whether or not a processed file is to be purged or evicted or otherwise moved or deleted within the content management system.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Some content object operations (e.g., preview preparation, malware scans, labeling, etc.) can be delayed, however they should not be delayed so long that any user's experience is negatively impacted. For example, although a preview preparation operation (or other file conversion operation) over a newly-incoming content object need not happen in synchronicity with the time that the content management system receives the newly incoming content object, the preview preparation operation should not be delayed until after a user needs the preview. This is because, if the preview preparation operation gets delayed until such time as a user actually needs the preview, then the user will experience latency while the preview preparation operation is initiated, scheduled onto some available computing resource, and then completes. For some operations, the latency is relatively small (e.g., perhaps only a few hundred milliseconds), however for other operations the latency might be quite long. Consider a newly incoming content object that is newly uploaded into the content management system. A malware scan over a newly incoming content object might require several seconds (or more) of elapsed time. If the scan were to be delayed until such time as a download of the newly incoming content object is requested, then the user that is requesting a download of the newly incoming content object might experience a several second (or more) delay to service the download request. Further, it can happen that relatively few computing resources are instantaneously available at the time of the download request. In this situation, the user might experience a delay of quite a lot longer than a few seconds. Incurring a delay that the user experiences is to be eschewed.

FIG. 1 depicts an environment in which embodiments of the invention can be practiced. As an option, one or more variations of environment 100 or any aspect thereof may be implemented in the context of the architecture and functionality of the embodiments described herein and/or in any environment.

The figure is being presented to illustrate how a scheduling model that is trained based on a history of events can be used to determine the scheduling urgency of performing an operation over a content object. More specifically, the figure is being presented to illustrate that a scheduling model can be used to generate an operation urgency list (e.g., workload list 109) that can be continuously updated such that more urgent operations are considered before less urgent operations.

In this embodiment, a content management system 101 maintains file system storage 105, which holds any number of content objects 106. Users take actions over the content objects, which actions cause events to be raised. The actions taken and events raised are captured (step 1) into a history of events. Various aspects of the content management system, its users, its content objects, and the history of events can be used to train a scheduling model (step 2). As depicted, scheduling model 1040 implements the function of predicting a timeframe for performance of a particular operation over a particular content object. It does so by correlating different types of events and other aspects of the content management system as they relate to the timeframe in which a particular operation has been carried out or should be carried out. As an example, if a first historical event corresponded to a first timestamp when an executable file was uploaded into the content management system by a first user, and if a second historical event corresponded to a second timestamp when the uploaded executable file was accessed by another user of the content management system, then the difference between the first timestamp and the second timestamp offers one data point that suggests the timeframe during which a malware scan should be performed.

Of course, the foregoing example includes only one datapoint, however; there may be many such pairs of upload and download events. Considering many such pairs of upload and download events, and more specifically, considering the time intervals between the uploads and respective downloads, an average and/or other statistics can be calculated. As such, it follows that if a malware operation over a future uploaded file completes within a statistically quantified interval of time, then, to a statistical degree of certainty it can be known that few or zero users will experience a wait time for a download. The foregoing is merely one example operation (e.g., that of a malware scan), however there are other operations that can avail of intelligent scheduling.

In some cases a scheduling model can be used to purposely delay performance of an operation over a content object. In other cases, a test can determine if a particular operation or plurality of operations should be performed immediately, i.e., without delay. This is shown by the "Yes (now)" branch of decision 102 that determines whether an operation is to be subject to intelligent, model-based scheduling, or whether the operation should be performed immediately (step 3). Specifically, upon occurrence of event 130 over a content object, decision 102 is carried out and, based on the type of operation corresponding to the event and/or the type of content object corresponding to the event, and/or other factors, a determination is made to either perform the operation immediately, in which case the "Yes (now)" branch of decision 102 is taken, or to delay performance of the operation, in which case the "No (later)" branch of decision 102 is taken.

Carrying out decision 102 for proceeding on the "Yes (now)" branch can include decision-making based on a binary decision, and/or based on the results of applying one or more policies and/or rules, and/or the decision for proceeding on the "Yes (now)" branch can be based on a predictor. A rule can be defined to fire (e.g., and take the "Yes (now)" branch of decision 102) on an event that corresponds to a particular file type. The rule might attach additional metadata to the event and/or label the event and/or the rule and/or any agent might attach additional metadata to any underlying content object. As examples, a file of type "P" might be labeled so as to carry the semantics of "Don't consider for immediate action". Additionally or alternatively, a rule or policy can be defined to always take action immediately. For example, based on a system-defined indexing policy, indexing operations might always be carried out immediately (e.g., so as to take the "Yes (now)" branch of decision 102). In some embodiments, an override rule can be configured to override any model-based determination. As such, a "kill switch" or "short circuit" override capability can be implemented by applying the override rule at decision 102. Still further, certain operations may be subject to a guarantee or tariff or regulation, or may be based on terms of a service level agreement. Responsive to the existence of such a guarantee or tariff or regulation or term of a service level agreement, a rule can be defined to always take action immediately by taking the "Yes (now)" branch of decision 102 rather than by taking the "No (later)" branch of decision 102.

In the case when the "No (later)" branch of decision 102 is taken, the scheduling model is consulted to determine a timeframe (step 4) for performing the operation or operations. The operations that are predicted to be needed to be performed more urgently are added to workload list 109 at a higher priority level as compared with operations that are predicted to be needed to be performed less urgently. Any number of priority levels 111 can be defined. Moreover a priority-based regime for processing the list entries at different priority levels 111 can be defined. As one example, a priority-based regime might require that all list items at a higher priority level must be processed (step 5) before any list items at a lower level are processed.

At any moment in time, possibly asynchronously with respect to any of the foregoing steps, certain items in the list (e.g., the more urgent operations to be performed over content objects) can be drawn from the workload list and initiated for performance on then-available computing resources (step 6). The actual performance of an operation over a content object can itself increase the likelihood of occurrence of a later event that is in turn used to trigger or influence downstream operations. Strictly as one example, the generation of a preview of "type1" (e.g., a read-only preview) might portend an upcoming user request for a preview of "type2" (e.g., a downsampled version of a read-only preview). As such, the probability that a user request for access to preview of "type2" will occur within a certain timeframe after generation of a preview of "type1" can be determined empirically based on the history of events (step 1, again). The specific history of events (e.g., a request for a preview of "type1" followed by a request for a preview of "type2") can be used to train the scheduling model (step 2, again).

The shown loop through step 1, step 2, step 3, step 4, step 5, and step 6 can continue continuously and indefinitely. Moreover, the actions taken pursuant to step 5 and step 6 can be undertaken continuously and asynchronously with respect to step 1, step 2, step 3, and step 4. More specifically, continuous model training and continuous operation scheduling can be carried out asynchronously.

Computing modules that carry out continuous model training can share data items with computing modules that carry out continuous operation scheduling. This is shown and described as pertains to the dataflow diagram of FIG. 2

Figure 2:
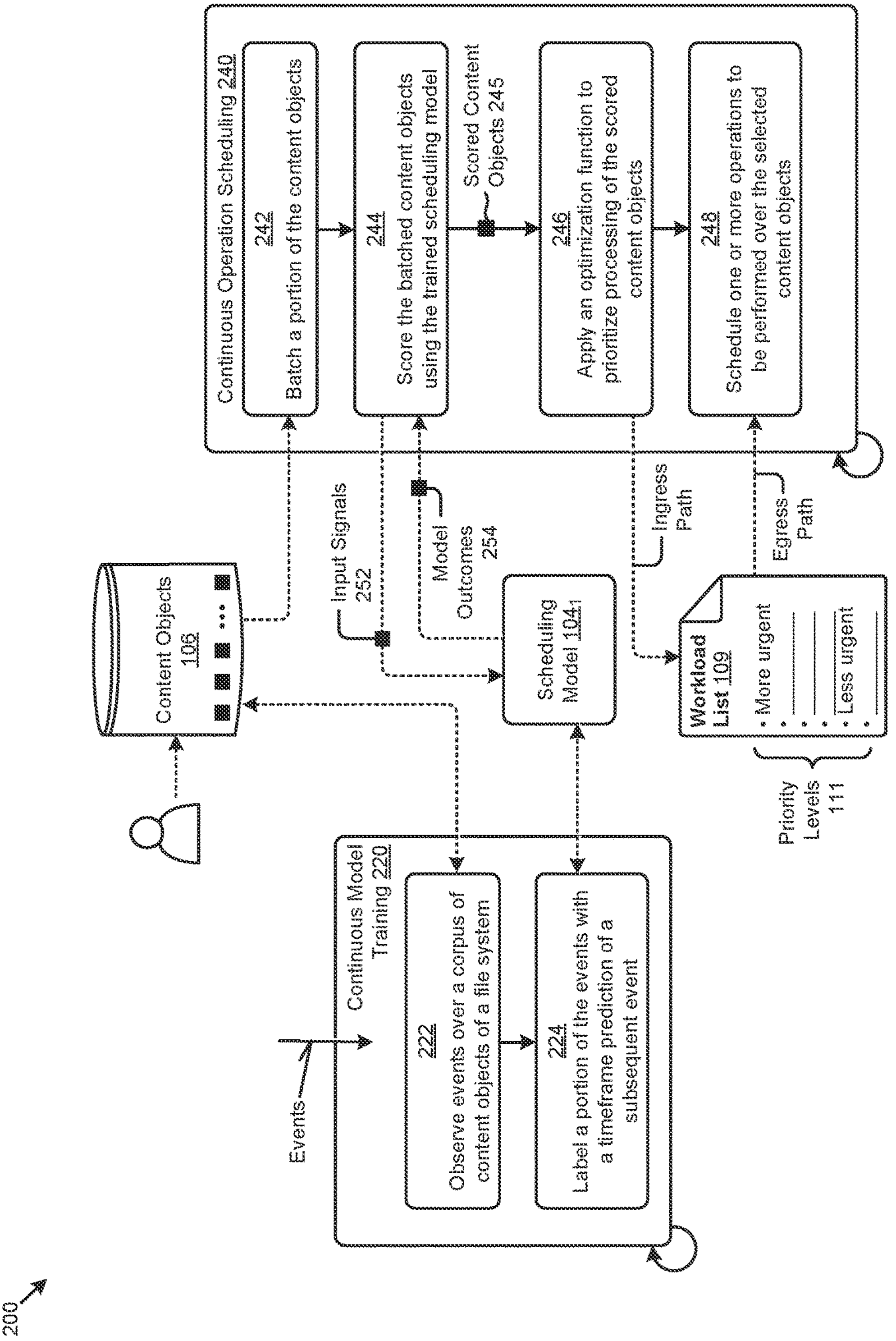
FIG. 2 presents a dataflow diagram to illustrate producer-consumer relationships as are present in systems that continuously update a machine learning predictor that is used to determine operation scheduling priorities, according to an embodiment.

FIG. 2 presents a dataflow diagram 200 to illustrate producer-consumer relationships as are present in systems that continuously update a machine learning predictor that is used to determine operation scheduling priorities. As an option, one or more variations of the dataflow or any aspect thereof may be implemented in the context of the architecture and functionality of the embodiments described herein and/or in any environment.

The figure is being presented to illustrate how continuous model training 220 can be carried out in parallel with continuous operation scheduling 240. Additionally, the figure is being presented to illustrate how continuous operation scheduling 240 operates as both a producer and a consumer of items in a prioritized list (e.g., workload list 109).

In a content management system, there are continuously ongoing events such as uploads of new content objects, downloads of existing content objects, file and folder accesses, events pertaining to newly registered users, events pertaining to identification of security threats, etc. Any or all of such events, aspects of users corresponding to the events, and aspects of content objects corresponding to the events can be analyzed to determine correlations between events.

More specifically, any or all events and aspects thereto can be used to generate a predictive model. In some cases, and as depicted in FIG. 2, a predictive model (e.g., scheduling model $\mathbf{104_1}$) can include a correspondence between a first event (e.g., an upload of a content object) and a corresponding second event (a download of the same content object). Moreover, the predictive model can include a specific timeframe prediction that characterizes the time interval between the occurrence of the first event and the occurrence of the second event. In some cases, many aspects, possibly hundreds or even thousands of different aspects, pertaining to the first event and the second event are captured and used in forming the predictive model.

Strictly as an example, when capturing a first event, not only the timestamp of an occurrence of the first event, but also which user raised the first event, the role or title of the user who raised the first event, aspects of the folder (e.g., private, widely shared, etc.), as well as other aspects may be included in the information that is captured in a history of events. Similarly, when capturing a second event, not only the timestamp of an occurrence of the second event, but also which user raised the second event, the role or title of the user who raised the second event, aspects of the folder from which the downloaded content object was drawn, as well as other aspects may be included in the information that is captured in a history of events.

Using the captured information, a machine learning model can be constructed. Such a machine learning model has the characteristic that, given a set of input signals (e.g., an event and corresponding aspects thereto) an outcome (e.g., a timeframe of when a second event might occur) is provided as an output of the model. When such a model is trained over a sufficiently rich set of input signals and corresponding model outcomes, the model can be used for scheduling operations to be performed over content objects. Model training and operation scheduling is discussed in further details hereunder.

Model Training

The shown implementation of continuous model training 220 includes a step for observing a stream of events (e.g., model inputs) and a step for correlating individual ones of the stream of events to one or more model outcomes. More specifically, step 222 operates as follows, (1) a first set of events that derive from or are associated with content objects of the content management system are observed and aspects pertaining to such events are gathered, and (2) a second set of events that derive from or are associated with the same or related content objects are observed and compared to the first set of events. In particular, the timing relationship between a first event and a second event is observed, which timing relationship is used to predict the time interval between the first event and the second event.

There are often hundreds of thousands of events that occur in any particular timeframe (e.g., in an hour or in a day, etc.) and as such, implementations of step 222 select particular events that are in some way related to if and when any content object operations are to be performed. Step 224 serves to label model outcomes that correlate to model inputs. Specifically, model outcomes can be associated (e.g., labeled) to a timeframe. Such a timeframe can be expressed in relative terms (e.g., within one minute, within one hour, etc.), or such a timeframe can be expressed in absolute terms (e.g., on Black Friday, on Christmas Eve, etc.) Once a model is trained over selected input signals and corresponding model outcomes, the model can be used for determining the timing of initiation of operations that are to be performed over content objects.

Operation Scheduling

Although there is a mode where content object operations on a particular subject content object are delayed until there is a user demand for access to the subject content object (e.g., a user access to the subject content object), that mode has at least the potential that the user might experience a user interface delay while the content object operation is being performed. In some cases, and for certain types of content object operations (e.g., a labeling operation), the incurred delay is sufficiently small (e.g., a few hundred milliseconds or less) such that users will not experience a delay. In other cases, and for other types of content object operations (e.g., a malware scan over a large file), and/or in certain computing environments the incurred delay, or at least the predictable duration of the delay can be very long delays, possibly leading to user frustration. One way to minimize user frustration due to such a delay is to perform needed content object operations immediately, i.e., as soon as it is known that a content object operation is possible. This is shown and depicted by the "Yes" branch of decision 102 of FIG. 1.

Another way to deal with the question of when to perform a particular content object operation is to prospectively perform the operations before risking possible user frustration. While this is intuitively satisfying, there may be many millions of content objects, with many more content objects being created moment by moment, only some of which should become the subject of a soon-to-be scheduled operation. Appropriately-sized batches of content objects can be drawn from the many millions of content objects using any known techniques. Moreover, such batches can be drawn and processed continuously.

More specifically, and as shown, continuous operation scheduling 240 of FIG. 2 depicts a stepwise technique for continuously processing batches. As shown, step 242 implements drawing batches of content objects from the many millions of content objects 106. Strictly as one technique for drawing batches, step 242 can be configured to be storage tier-aware such that batches are first drawn from a "hot tier" storage until all items in the hot tier have been considered before forming any batches from a second tier or "cold tier" storage. In some cases, step 242 considers batches of content objects as they arrive into the content management system. Irrespective of how any given set of content objects are drawn into a batch, the batches content objects can be scored (step 244) to reach a prediction as to the soonest that any one of the considered content objects would need to be performed so as to complete the operation before risking user frustration.

Such scoring can be carried out by consulting an instance of the scheduling model. Specifically, given a content object and its metadata, a set of input signals 252 can be provided to the scheduling model. The scheduling model in turn produces model outcomes 254. In some cases there may be several model outcomes that derive from a given set of input signals. For example, a first model outcome might pertain to the predicted timeframe of when a first content object operation needs to be completed, while a second model outcome from the same set of input signals might pertain to the predicted timeframe of when a second, different type of content object operation needs to be completed.

In cases where there are multiple model outcomes that refer to different timeframe predictions, an earlier or earliest one of the timeframe predictions can be used to score a subject content object. The foregoing consultation with the scheduling model can be performed over each content object in the batch. As such the performance of step 244 results in a set of scored content objects 245. These scored content objects 245 can be further considered with respect to the then-current conditions in the content management system and/or in its environment. In some cases a particular subject content object from scored content objects 245 might be scored as being urgent (e.g., to be converted within a couple of minutes), however there might be other content objects that had appeared in an earlier batch that were also deemed as urgent, and those earlier-scored urgent content objects might need to be processed before the later-scored urgent content objects. Accordingly, step 246 serves to apply an optimization function over the scored content objects. As shown, applying an optimization function over the scored content objects results in entry of one or more of the scored content objects into a prioritized workload. This is shown by the priority levels 111 of workload list 109. Selected example priority levels are depicted as "More urgent", "Less urgent" and "Never", however any number or granularity of priority levels can be accommodated within the range of priority levels 111.

Workload list 109 has an ingress path over which prioritized entries are entered (e.g., for adding to the list in response to performance of step 246) and an egress path over which prioritized entries are drawn (e.g., when selecting entries to be processed in response to performance of step 248).

In some cases, the scheduling of operations to be performed over the selected content objects (step 248) can comprehend an "as-soon-as-possible" policy and/or, the scheduling of operations to be performed over content objects can comprehend an "as-late-as-possible" or a "just-in-time" policy. Moreover, some types of operations might be subject to an "as-soon-as-possible" policy whereas other types of operations might be subject to an "as-late-as-possible" policy.

Figure 3:
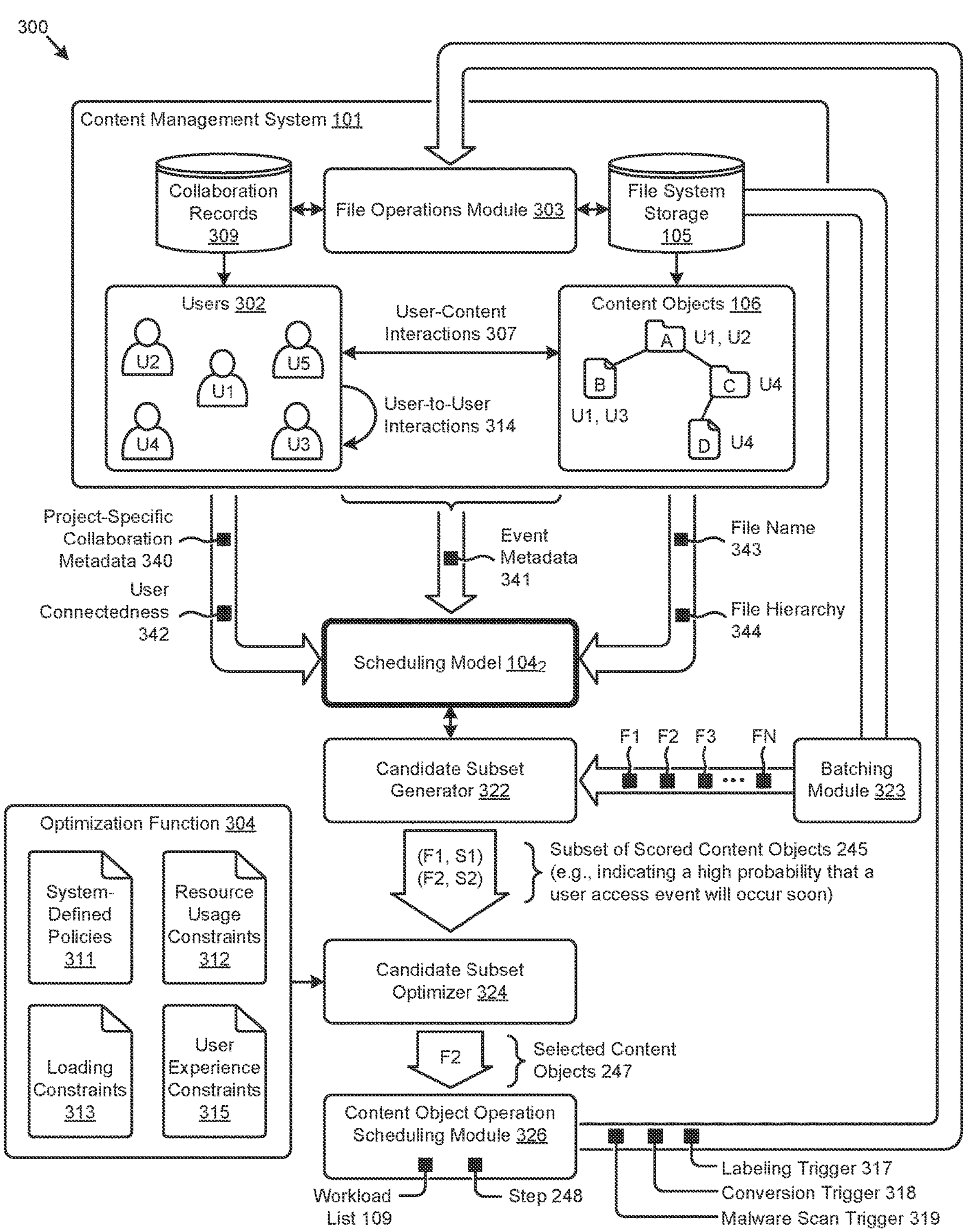
FIG. 3 depicts an example system for using a machine learning predictor to determine a policy-based operation completion schedule, according to an embodiment.

An example system that implements file scheduling in accordance with a policy-aware optimization function is shown and described as pertains to FIG. 3.

FIG. 3 depicts an example system 300 for using a machine learning predictor to determine a policy-based operation completion schedule. As an option, one or more variations of system 300 or any aspect thereof may be implemented in the context of the architecture and functionality of the embodiments described herein and/or in any environment.

The figure is being presented to illustrate practical applications within a system that continuously updates a machine learning predictor to determine operation scheduling priorities. As shown, the system includes a content management system 101 in which users 302 interact with content objects 106 (e.g., via user-content interactions 307) and other users (e.g., via user-to-user interactions 314). Such interactions, plus any metadata that corresponds to the interactions and/or any metadata that corresponds to the content objects and/or any metadata that corresponds to the users themselves can be selected as input signals into scheduling model 1042.

In the depicted embodiment, the input signals used for training the scheduling model include (1) user-to-user parameters such as user connectedness 342, (2) collaboration parameters such as project-specific collaboration metadata 340, (3) event metadata 341 pertaining to the occurrence of recent downloads, (4) event metadata such as a content object file name 343, and (5) event metadata such as information pertaining to the file hierarchy 344 of a particular content object. Any of the foregoing can be used singly, or in combination, or in conjunction with derivative signals for training the scheduling model. Furthermore, any timing-oriented event metadata can be used for training the scheduling model.

Strictly as one example of training, it might be determined based on accessing a history of events of when a first user having a particular user connectedness (e.g., as determined by collaboration records 309) uploads a file to the content management system, it happens that 90% of users that are connected to the first user will download that same file within the first day of upload, whereas the remaining 10% of users that are connected to the first user will download that same file in a timeframe after the first day. As such, the scheduling model would be trained to report an outcome that, to a 90% accuracy, a file uploaded by the first user will be downloaded by the first user's collaborators within the same day. As such, content object operations that should be performed on those content objects should be scheduled with a more urgent priority than would be, for example, content object operations that are likely to be needed at a predictably later time.

Once a scheduling model is sufficiently trained (e.g., it has a particular specified degree of precision and recall), then the scheduling model can be used as a predictor. Any event can trigger an access to the scheduling model for purposes of predictions as to if and when content object operations should be performed. One such event is the occurrence of a newly uploaded content object being entered into the content management system. Another such event is the readiness of a batch of content objects drawn from the content management system. FIG. 3, specifically the bottom portion of FIG. 3, presents operational modules for processing batches of content objects drawn from the content management system.

As shown in the bottom portion of FIG. 3, a batching module 323 draws content objects from file system storage 105, and presents those individual content objects (e.g., F1, F2, F3, . . . , FN) to a candidate subject generator 322. The candidate subject generator in turn accesses the trained instance of scheduling model 1042 and, based at least in part on the outcome(s) from the scheduling model, each individual content object is scored. In this example, only some of the scores are sufficiently high to warrant selection for further processing. This is depicted by the duples (F1, S1) and (F2, S2). More specifically, even though individual content objects (e.g., F1, F2, F3, . . . , FN) were all scored by the candidate subject generator, only content objects F1 and F2 had a score sufficiently high to warrant inclusion into the subset of scored content objects 245. As shown, only some of the scored content objects that have a high probability that a user access event will occur soon (e.g., a user download will be requested within 10 minutes) are considered by the candidate subset optimizer 324. The other content objects, (i.e., those that are not deemed to have a high probability that a user access event will occur soon) are considered as dropped and are merely dropped unmodified, or are merely associated with an indication that the content object was considered (e.g., as some moment in time) and deemed to be dropped.

A candidate subset of content objects (e.g., the content objects of the subset of scored content objects 245) are presented to a candidate subset optimizer that further reduces the number of content objects under consideration to only those content objects that achieve some optimization metric based on a system-provided optimization function 304. In the example shown, the optimization function 304 includes policies (e.g., system-defined policies 311) and constraints (e.g., resource usage constraints 312, loading constraints 313, and user experience constraints 315). The policies and constraints are sufficient to establish an optimization regime where only certain specific content objects and corresponding content object operations are considered for entry into the workload list 109.

Strictly as examples, system-defined policies 311 may specify an "as-soon-as-possible" policy, and/or the system-defined policies 311 may specify an "as-late-as-possible" policy or some other policy, which particular policy informs operation scheduling. Table 1 lists some example policies and usages.

TABLE 1

| System-defined policies | |
|---|---|
| Policy Name | Meaning |
| Egalitarian | All customers treated equally |
| Replicated Files Go/No-Go | Go/No-Go on copies |
| Eviction Weighting | Preference to evict a content object to a lower tier rather than perform content object operation |
| Preferred User | Apply higher urgency for preferred users |
| Suspicious User | Apply higher urgency for suspicious users |

Regarding constraints, resource usage constraints 312 might specify that only CPUs that are reporting then-current utilization of less than 50% are to be considered for performance of a workload. Loading constraints 313 might specify that only a certain number of workload list items are to be queued to any given CPU. User experience constraints might indicate that a time delay of 1.5 seconds is acceptable.

Any/all of the aforementioned aspects of an optimization function can be applied in order to select only certain content objects (e.g., selected content objects 247) and corresponding content object operations that are present in workload list 109.

A content object operation scheduling module 326 serves to manage ingress and egress of items in the workload list 109. More specifically, content object operation scheduling module 326 can implement any variation of step 248 to determine which items of the workload are to be scheduled onto computing resources. As heretofore mentioned, the optimization function selects only certain content objects and corresponding content object operations to be performed. Thus, when the content object operation scheduling module 326 determines that some particular content objects should be subjected to a corresponding particular content object operation or operations, the content object scheduling module emits triggers that are received by an operational unit of the content management system (e.g., file operations module 303). In the example system shown, the content object operation scheduling module 326 is configured to emit a labeling trigger 317, and/or a conversion trigger 318, and/or a malware scan trigger 319. Any trigger can be composed of a content object designation and a list of content object operations to be performed on the content object. In some cases, the trigger further includes a designation of a computational element that is slated to carry out the content object operations to be performed on the content object. Upon receipt of a trigger, the file operations module 303 commences to perform the content object operations on the content object.

Effective use of the scheduling model 1042 of FIG. 3 for determining which content objects should be subject to which content object operations is predicated at least in part on how the scheduling model is trained. More specifically, and in accordance with the example system of FIG. 3, the scheduling model is trained to predict the likelihood and timing of occurrence of certain user events. Certain user events are associated with which content object operations would need to have been completed before occurrence of a corresponding event. A technique for predictive model training is shown and described as pertains to FIG. 4.

Figure 4:
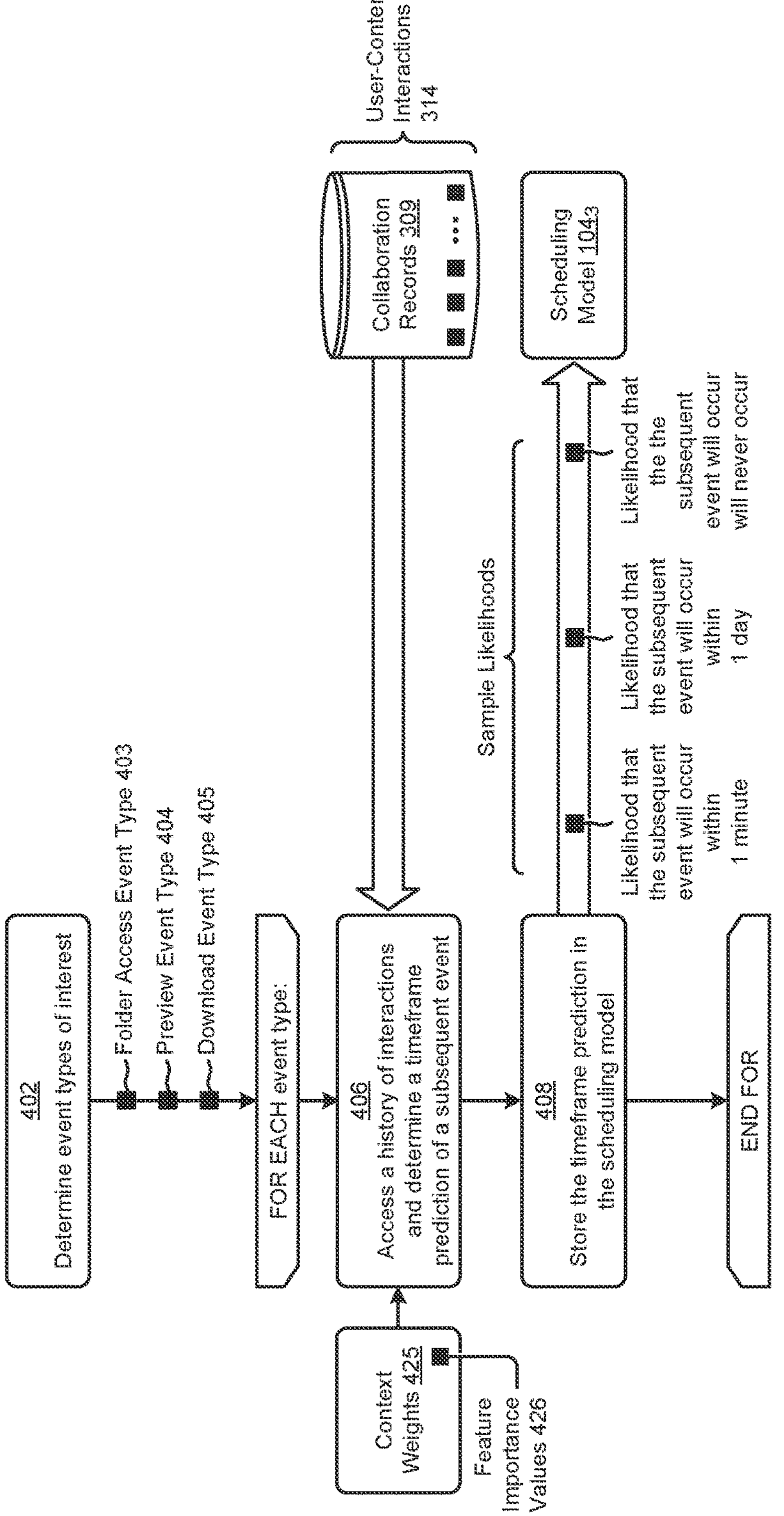
FIG. 4 depicts an example predictive model training technique as used in systems that use a machine learning predictor to determine operation scheduling urgency, according to an embodiment.

FIG. 4 depicts an example predictive model training technique 400 as used in systems that use a machine learning predictor to determine operation scheduling urgency. As an option, one or more variations of predictive model training technique 400 or any aspect thereof may be implemented in the context of the architecture and functionality of the embodiments described herein and/or in any environment.

The occurrence of certain user events of certain types can be used to predict which content object operations would need to have been completed before occurrence of a certain user event of a certain type. For example, a download event over content object "X" might mean that a malware scan would necessarily need to have been completed on content object "X" before the download event can be satisfied. As another example, a file preview event over content object "X" might mean that file conversions to support such a preview view would advantageously need to have been completed on content object "X" before the preview request. As yet another example, a folder access event over content object "Folder F" might mean that labeling (e.g., security labeling, policy association labeling, etc.) on the folder and its contents would advantageously need to have been completed on content object "Folder F" before the folder access. In order to schedule when to perform content object operations over specific content objects, the scheduling model needs to be trained with respect to selected event types.

Prior to training, step 402 is undertaken to determine event types of interest. In this example, the event types of interest are folder access event type 403, preview event type 404, and download event type 405. In addition to the foregoing event types of interest, context pertaining to the events can be weighted (e.g., by context weights 425) and used for weighting signals that are used in training the scheduling model. Strictly as examples, Table 2 lists particular features of events and corresponding weights (e.g., the shown feature importance values 426) that are drawn from the historical context interactions that precede an event of interest.

TABLE 2

| Feature importance values | |
|---|---|
| Signal/Information | Weighting Value |
| Preview Event | 0.3049763959199558 |
| Upload Event | 0.08623414968160481 |
| Root Folder Location | 0.03067368739785388 |
| User File Usage Rate | 0.021634736408841608 |

Once the event types of interest have been determined, then, for each event type of interest, historical interactions that precede an event of interest are used to populate the scheduling model.

More specifically, for each event type of interest, a history of events (e.g., user-content interactions 314) that had preceded a particular event of interest are gathered (step 406), weighted (e.g., using context weights 425), and stored (step 408) as weighted training signals that serve as input signals of the scheduling model. In some cases, a presaging prior event begins a time epoch that ends when the particular event of interest occurs. As an example, a file upload event might presage a download event and thus demark the beginning of a time epoch. In some embodiments, various additional signals, including additional historical events and/or additional conditions present during the epoch are added as input signals to the scheduling model 1043. The model outcome is the time-oriented occurrence of when a particular event of interest is predicted to occur. To illustrate, and strictly as an example, if an upload event occurred at time=T1 (i.e., marking the beginning of an epoch), and if the conditions at that time included that the owner of the uploaded document was an influencer, and if a download request for the uploaded file was raised from a collaborator at time T2, then the difference T2-T1 is used as a predictor (e.g., a model output) of when, for example, a malware scan should be completed. This time difference T1-T2 can be used to determine when to schedule the malware scan.

In some embodiments, the predictor has a time granularity that comports with activities that occur in a collaboration system. Strictly as an alternative example implementation of a predictor, a model outcome can characterize a probability of an event occurring in a time period. This is shown in the embodiment of FIG. 4 by the outcomes, "Likelihood that the event will occur within one minute", "Likelihood that the event will occur within one day", and "Likelihood that the event will never occur". A single scheduling model can be trained over each event type of interest, and as such a single scheduling model can be configured to emit separate outcomes for each of the separate event types of interest.

Figure 5A:
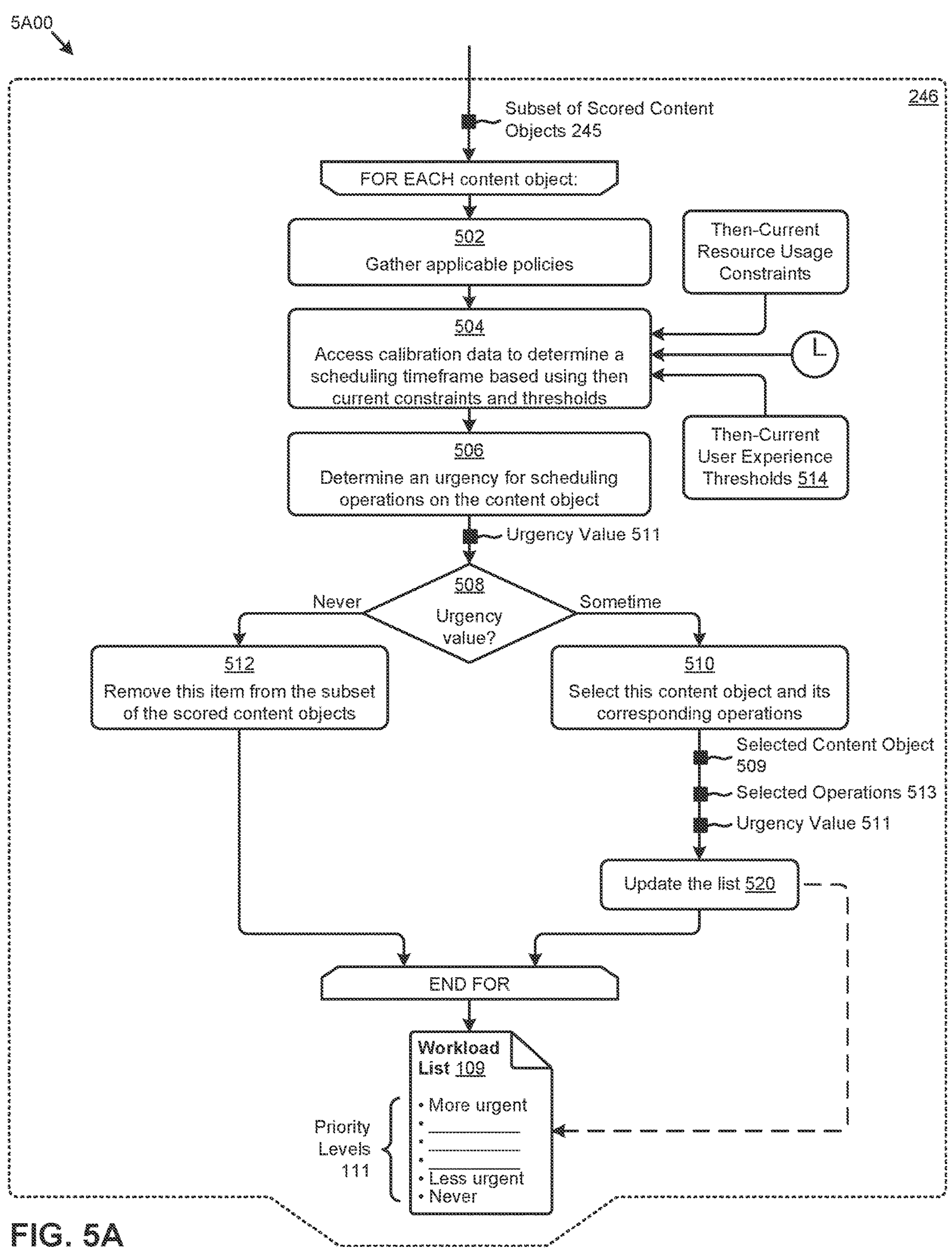
FIG. 5A depicts an example operation scheduling technique as used in systems that manage a continuously updated list of to-be-performed content object operations, according to an embodiment.

FIG. 5A depicts an example operation scheduling technique 5A00 as used in systems that manage a continuously updated list of to-be-performed content object operations. As an option, one or more variations of operation scheduling technique 5A00 or any aspect thereof may be implemented in the context of the architecture and functionality of the embodiments described herein and/or in any environment.

The figure is being presented to illustrate one particular technique of prioritizing operations over content objects of a content management system. In this embodiment, a series of determinations and decisions are taken to determine an urgency value that informs whether or not to schedule a content operation over a particular content object, based on a corresponding event. The determination is made on the basis of several factors, namely (1) the event type, (2) system-defined policies, (3) then-current computing resource availability, and (4) calibration of a scheduling urgency based on the likelihood of incurring a user-detectable delay.

This embodiment commences upon receipt of a subset of score content objects 245. Then, for each content object in that set, any applicable policies pertaining to the particular content object are gathered (step 502). The policies may include limitations and/or guarantees such as may be applied when assessing the urgency of performance of a content object operation. As shown, at step 504, calibration data is accessed so as to determine a scheduling timeframe based on then-current constraints and thresholds, and/or based on then-current resource usage constraints. In some cases, aspects of a service level agreement (e.g., guarantees) inform scheduling.

Based on the scheduling timeframe determined in step 506, an urgency value 511 is calculated. More specifically, step 506 calculates an urgency value for each specific content object. For example, if two different content objects were determined (e.g., in step 504) to have the same scheduling timeframe (e.g., "Now") for performance of a content object operation, but one of the content object operations required more CPU processing time, then the content object operation that required more CPU processing time would be associated with a higher urgency value. The workload list 109 may be consulted during performance of this step, for example, to retrieve urgency values for items already in the workload list.

A decision 508 is then taken to characterize the urgency value into "Never" or "Sometime". Strictly as one implementation possibility, content objects that are associated with a very low urgency value (e.g., corresponding to the "Never" branch of 508) are removed from the subset of scored content objects (step 512). In some situations it is possible that a particular content object was already in the workload list, in which situations, and upon taking the "Never" branch of 508, the particular content object that was already in the workload list is removed from the workload list. On the other hand, if the content object is associated with a higher urgency value (e.g., corresponding to the "Sometime" branch of 508), then this content object is selected (step 510). The particular selected content object 509, its corresponding selected operation 513, and its corresponding urgency value 511 are entered (step 520) into the workload list 109.

Figure 5B:
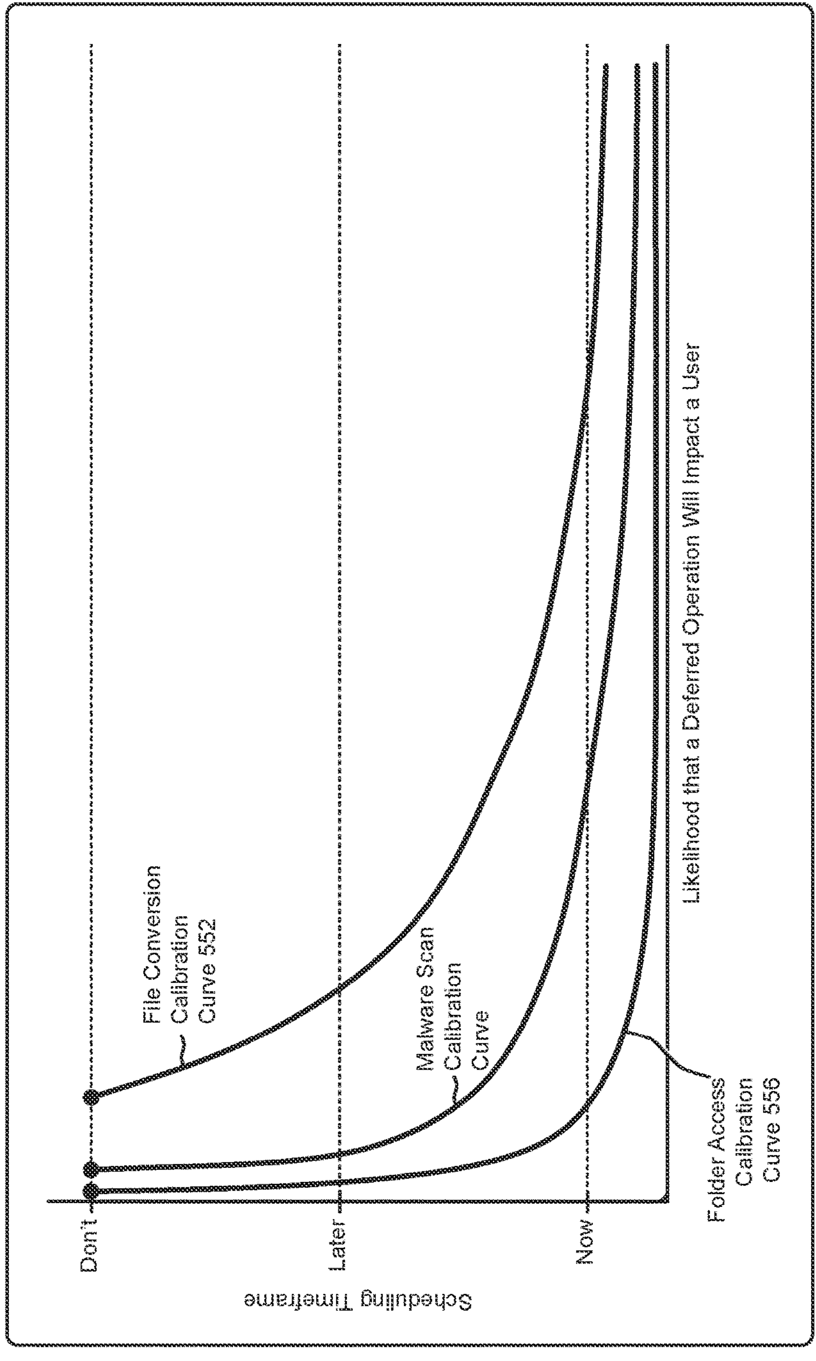
FIG. 5B depicts several example calibration curves as used to position entries into a list of to-be-performed content object operations, according to an embodiment.

As heretofore discussed as pertains to step 504 of operation scheduling technique 5A00, calibration data is accessed so as to determine a scheduling timeframe based on the then-current constraints and thresholds. More specifically, and as shown in FIG. 5B, calibration data is accessed so as to determine a scheduling timeframe based any constraints or then-current user experience thresholds 514 imposed by considering the operation with respect to a likelihood that deferring an operation will impact a user. The impact can be calibrated against a particular type of content object operation. Various calibration curves are shown and described as pertains to FIG. 5B.

FIG. 5B depicts several example calibration curves 5B00 as used to position entries into a list of to-be-performed content object operations. As an option, one or more variations of calibration curves 5B00 or any aspect thereof may be implemented in the context of the architecture and functionality of the embodiments described herein and/or in any environment.

As shown, the calibration model presented has a likelihood value plotted along the abscissa. The calibration model operates by (1) given a likelihood that a user-detectable delay would be incurred if/when the particular type of content object operation is performed, then (2) the calibration curve that corresponds to the particular type of content object operation is used to determine a scheduling timeframe. Calibration curves are shown strictly as examples. In the example curves, it is deemed to be more urgent to perform folder access operations (e.g., as depicted by the folder access calibration curve 556) that are related to a predicted folder access than it is to perform file conversions (e.g., as depicted by the file conversion calibration curve 552). In this example set of curves, for a given likelihood that a deferred operation will impact a user (e.g., referring to a point along the abscissa of the chart), the scheduling timeframe for operations pertaining to a predicted folder access (e.g., the corresponding point on the ordinate of the chart) is always closer to "Now" than is the scheduling timeframe for file conversion operations.

The actual shape of the curves can be based on empirically-obtained datapoints and there can be many curves corresponding to many types of actions and/or many types of content objects. For example, there might be calibration curve for a particular action (e.g., a download action) on a particular file or type of file, and that particular file or type of file can be subjected to analysis so as to determine a score (e.g., a download score), which in turn informs the shape of the calibration curve for that particular action on that particular file or type of file. In some cases, an upload event history (e.g., a history of upload events) undertaken by a user or users or super-users to upload content objects of a certain type can be used to inform the shape of a calibration curve for that particular action (e.g., upload).

ADDITIONAL EMBODIMENTS OF THE DISCLOSURE

Instruction Code Examples

Figure 6A:
FIG. 6A and FIG. 6B depict system components as arrangements of computing modules that are interconnected so as to implement certain of the herein-disclosed embodiments.
Figure 6A:
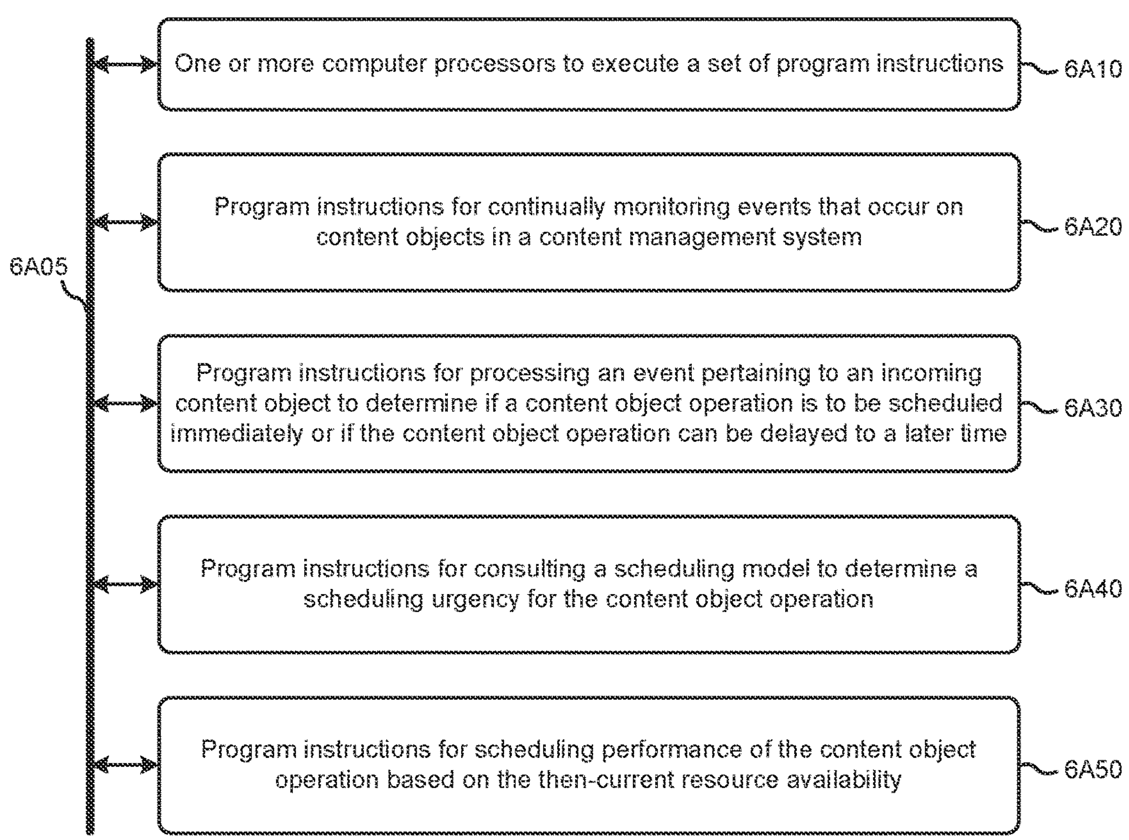

FIG. 6A depicts a system 6A00 as an arrangement of computing modules that are interconnected so as to operate cooperatively to implement certain of the herein-disclosed embodiments. This and other embodiments present particular arrangements of elements that, individually or as combined, serve to form improved technological processes that address scheduling content object operations for just-in-time completion in the presence of resource limitations. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising one or more computer processors to execute a set of program code instructions (module 6A10) and modules for accessing memory to hold program code instructions for: continually monitoring events that occur on content objects in a content management system (module 6A20); processing an event pertaining to an incoming content object to determine if a content object operation is to be scheduled immediately or if the content object operation can be delayed to a later time (module 6A30); consulting a scheduling model to determine a scheduling urgency for the content object operation (module 6A40); and scheduling performance of the content object operation based on the then-current availability of computing resources (module 6A50).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

Figure 6B:
Figure 6B:
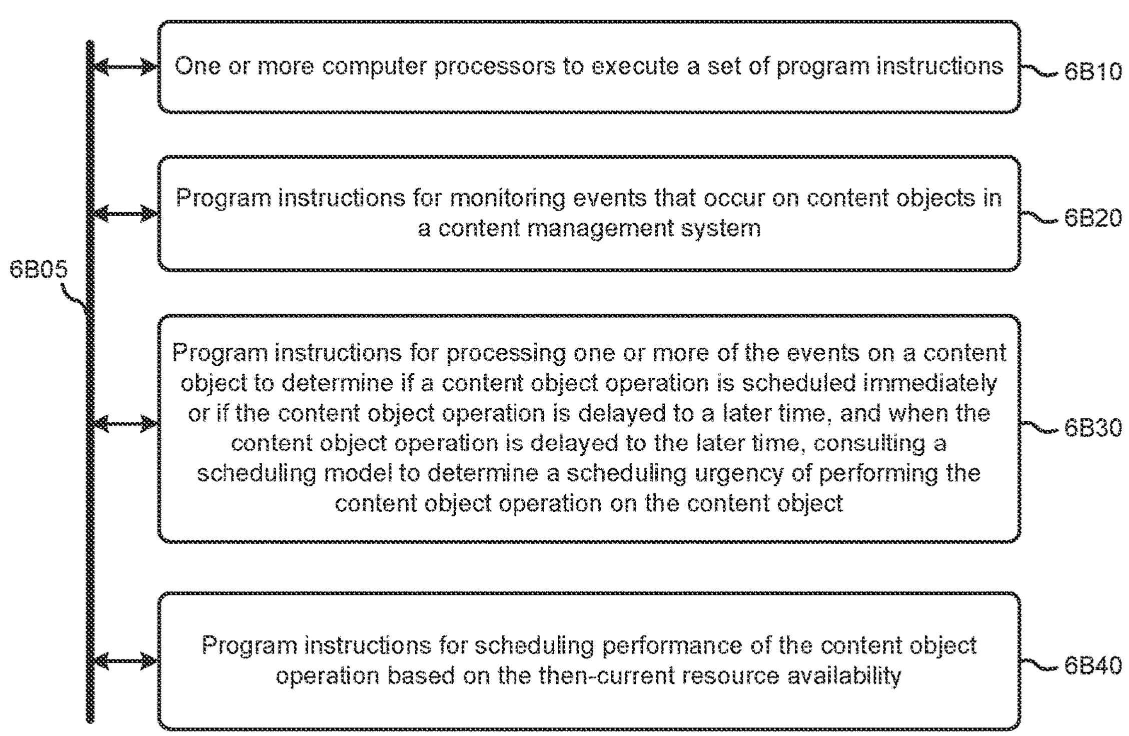

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising one or more computer processors to execute a set of program code instructions (module 6B10) and modules for accessing memory to hold program code instructions to perform: monitoring events that occur on content objects in a content management system (module 6B20); processing one or more of the events on a content object to determine if a content object operation is scheduled immediately or if the content object operation is delayed to a later time, and when the content object operation is delayed to the later time, consulting a scheduling model to determine a scheduling urgency of performing the content object operation on the content object (module 6B30); and scheduling performance of the content object operation based on then-current resource availabilities (module 6B40).

System Architecture Overview

Additional System Architecture Examples

Figure 7A:
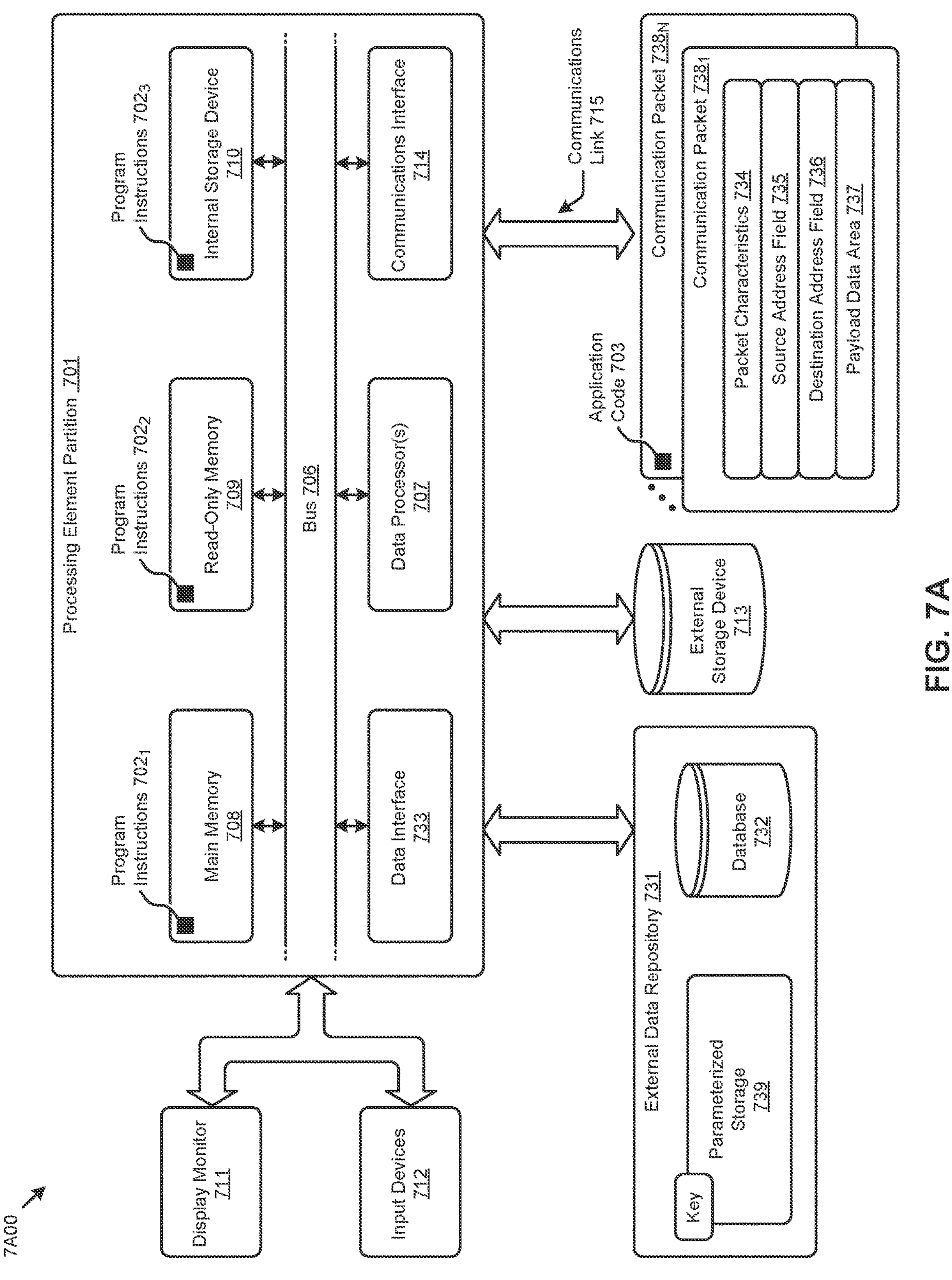
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions 7021, program instructions 7022, program instructions 7023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet 7381, communication packet 738N) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to continuously updating a machine learning predictor to determine scheduling priorities. A module may include one or more state machines and/or combinational logic used to implement or facilitate the operational and/or performance characteristics pertaining to continuously updating a machine learning predictor to determine scheduling priorities.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of continuously updating a machine learning predictor to determine scheduling priorities). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to continuously updating a machine learning predictor to determine scheduling priorities, and/or for improving the way data is manipulated when deploying a continuously updated machine learning predictor to determine operation scheduling priorities.

Figure 7B:
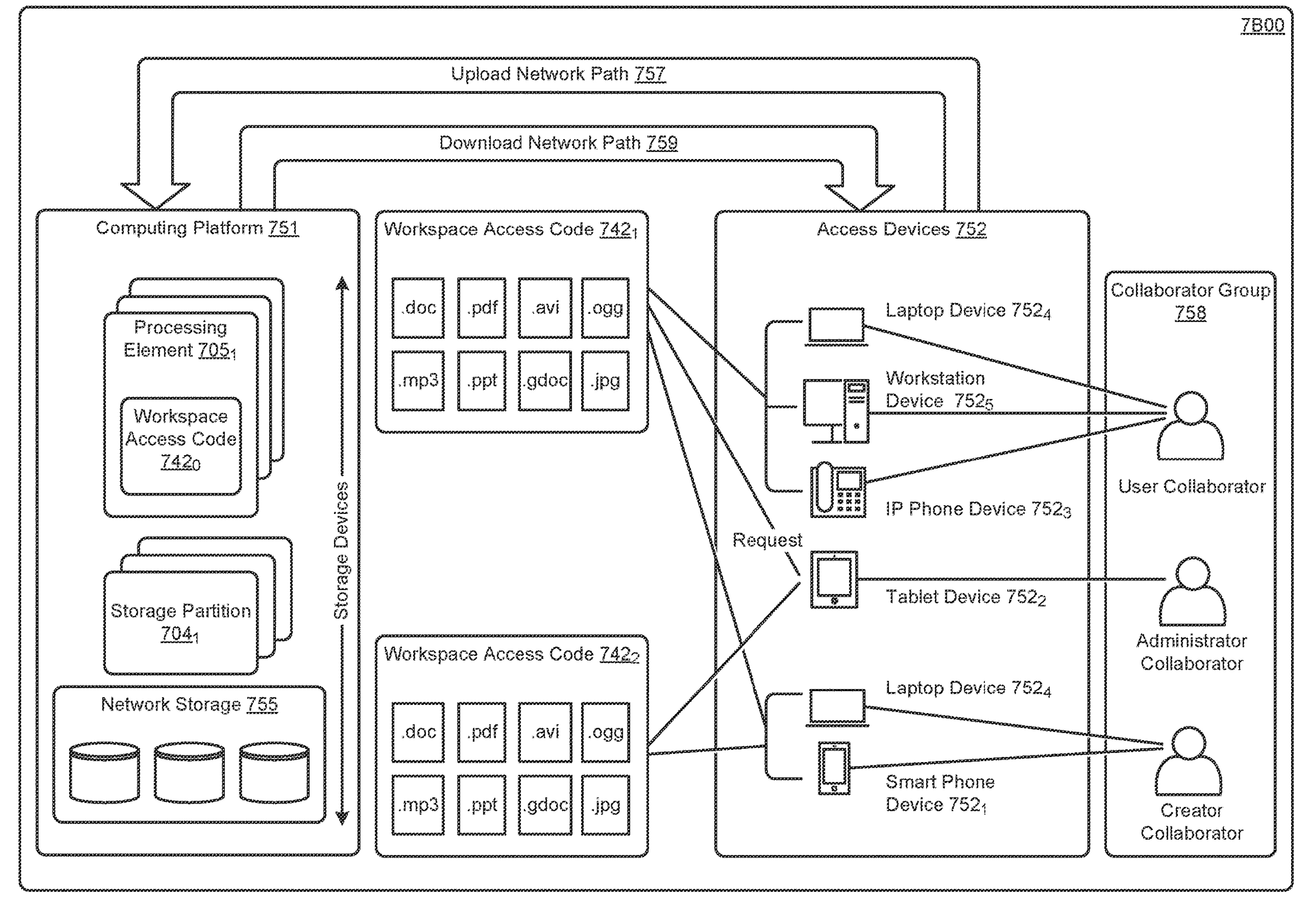

FIG. 7B depicts a block diagram of an instance of a cloud-based environment 7B00. Such a cloud-based environment supports access to workspaces through the execution of workspace access code (e.g., workspace access code 7420, workspace access code 7421, and workspace access code 7422). Workspace access code can be executed on any of access devices 752 (e.g., laptop device 7524, workstation device 7525, IP phone device 7523, tablet device 7522, smart phone device 7521, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $\mathbf{705}_1$). The workspace access code can interface with storage devices such as networked storage 755. Storage of workspaces and/or any constituent files or objects, and/or any other code or scripts or data can be stored in any one or more storage partitions (e.g., storage partition $\mathbf{704}_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for prioritizing operations over content objects of a content management system, the method comprising:

processing, by executing a continuously updated machine learning model, one or more history events of a content object of the content management system to predict a first timeframe at or by which the content object will be accessed in the future;

determining, by the continuously updated machine learning model, whether to schedule a content object operation at or by a first time or delay scheduling of the content object operation at or by a second time that is later in time than the first time;

when the continuously updated machine learning model selects scheduling the content object operation to be executed at or by the second time, executing a scheduling model of the continuously updated machine learning model to determine a second timeframe for executing the content object operation on the content object, the second timeframe being determined based at least in part on a scoring model used by the scheduling model;

updating a data structure in memory with an entry indicative of the second timeframe at or by which the content object operation is to be executed based at least in part on resource availability; and executing the content object operation according to the second timeframe that was determined by the scheduling model.

2. The computer-implemented method of claim 1, wherein scheduling the content object operation that is to be executed on the content object at or by the second time is based at least in part on a first result of applying one or more policies or a second result of applying one or more rules.

3. The computer-implemented method of claim 2, wherein at least one of the one or more policies or the one or more rules comprises at least one of a rule pertaining to an indexing policy, an override rule, a rule pertaining to a guarantee, a rule pertaining to a tariff or a regulation, and a term of a service level agreement.

4. The computer-implemented method of claim 1, wherein the scheduling model is trained at least on signals derived from a history of events within the content management system.

5. The computer-implemented method of claim 4, wherein at least some of the signals derived from the history of events are weighted based at least in part on features that are drawn from user to content interactions that precede an event of interest.

6. The computer-implemented method of claim 1, further comprising:

predicting a future event in which the content object is predicted to be accessed; and consulting a calibration model of the continuously updated machine learning model to determine the second timeframe, wherein the second timeframe is determined for the future event before users raise an access request for accessing the content object.

7. The computer-implemented method of claim 1, further comprising applying an optimization function of the continuously updated machine learning model to prioritize scheduling of the content object operation.

8. The computer-implemented method of claim 7, wherein the optimization function includes at least one of computing resource availability, one or more budget constraints, and one or more user experience constraints.

9. The computer-implemented method of claim 1, further comprising the scheduling model:

receiving input signals, generating model outcomes that score content objects of the content management system based at least in part on the received input signals, wherein respective scored content objects are prioritized and entered into a workload list according to their respective priorities, the workload list indicating a schedule of one or more content object operations.

10. A system comprising:

a storage medium having stored thereon a sequence of instructions; and one or more processors that execute the sequence of instructions to cause the one or more processors to perform a set of acts, the set of acts comprising:

processing, by executing a continuously updated machine learning model, one or more history events of a content object of the content management system to predict a first timeframe at or by which the content object will be accessed in the future;

determining, by the continuously updated machine learning model, whether to schedule a content object operation at or by a first time or delay scheduling of the content object operation at or by a second time that is later in time than the first time;

when the continuously updated machine learning model selects scheduling the content object operation to be executed at or by the second time, executing a scheduling model of the continuously updated machine learning model to determine a second timeframe for executing the content object operation on the content object, the second timeframe being determined based at least in part on a scoring model used by the scheduling model;

updating a data structure in memory with an entry indicative of the second timeframe at or by which the content object operation is to be executed based at least in part on resource availability; and executing the content object operation according to the second timeframe that was determined by the scheduling model.

11. The system of claim 10, wherein scheduling the content object operation that is to be executed on the content object at or by the second time is based at least in part on a first result of applying one or more policies or a second result of applying one or more rules.

12. The system of claim 10, wherein the scheduling model is trained at least on signals derived from a history of events within the content management system.

13. The system of claim 10, the set of acts further comprising:

predicting a future event in which the content object is predicted to be accessed; and consulting a calibration model of the continuously updated machine learning model to determine the second timeframe, wherein the second timeframe is determined for the future event before users raise an access request for accessing the content object.

14. The system of claim 10, further comprising applying an optimization function of the continuously updated machine learning model to prioritize scheduling of the content object operation.

15. A computer program product embodied in a non-transitory computer readable medium and having stored thereon a sequence of instructions which, when executed by a processor, causes the processor to execute a set of acts, the set of acts comprising:

processing, by executing a continuously updated machine learning model, one or more history events of a content object of the content management system to predict a first timeframe at or by which the content object will be accessed in the future;

determining, by the continuously updated machine learning model, whether to schedule a content object operation at or by a first time or delay scheduling of the content object operation at or by a second time that is later in time than the first time;

when the continuously updated machine learning model selects scheduling the content object operation to be executed at or by the second time, executing a scheduling model of the continuously updated machine learning model to determine a second timeframe for executing the content object operation on the content object, the second timeframe being determined based at least in part on a scoring model used by the scheduling model; and updating a data structure in memory with an entry indicative of the second timeframe at or by which the content object operation is to be executed based at least in part on resource availability; and executing the content object operation according to the second timeframe that was determined by the scheduling model.

16. The computer program product of claim 15, wherein scheduling the content object operation that is to be executed on the content object at or by the second time is based at least in part on a first result of applying one or more policies or a second result of applying one or more rules.

17. The computer program product of claim 16, wherein at least one of the one or more policies or the one or more rules comprises at least one of a rule pertaining to an indexing policy, an override rule, a rule pertaining to a guarantee, a rule pertaining to a tariff or a regulation, and a term of a service level agreement.

18. The computer program product of claim 15, wherein the scheduling model is trained at least on signals derived from a history of events within the content management system.

19. The computer program product of claim 18, wherein at least some of the signals derived from the history of events are weighted based at least in part on features that are drawn from user to content interactions that precede an event of interest.

20. The computer program product of claim 15, the set of acts further comprising:

predicting a future event in which the content object is predicted to be accessed; and consulting a calibration model of the continuously updated machine learning model to determine the second timeframe, wherein the second timeframe is determined for the future event before users raise an access request for accessing the content object.

21. The computer program product of claim 15, further comprising applying an optimization function of the continuously updated machine learning model to prioritize scheduling of the content object operation.

* * * * *